United States Patent
Stavale (10) Patent No.: US 10,082,804 B2
(45) Date of Patent: Sep. 25, 2018

(54) OPTIMIZED TECHNIQUE FOR STAGING AND DE-STAGING PUMPS IN A MULTIPLE PUMP SYSTEM

(71) Applicant: ITT MANUFACTURING ENTERPRISES LLC, Wilmington, DE (US)

(72) Inventor: Anthony E. Stavale, Seneca Falls, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 728 days.

(21) Appl. No.: 14/108,765

(22) Filed: Dec. 17, 2013

(65) Prior Publication Data

US 2014/0180485 A1    Jun. 26, 2014

Related U.S. Application Data

(60) Provisional application No. 61/738,129, filed on Dec. 17, 2012.

(51) Int. Cl.
| | |
|---|---|
| G05D 7/06 | (2006.01) |
| F04D 15/00 | (2006.01) |
| F04D 15/02 | (2006.01) |

(52) U.S. Cl.
CPC .......... *G05D 7/06* (2013.01); *F04D 15/0066* (2013.01); *F04D 15/029* (2013.01); *F04D 15/0254* (2013.01)

(58) Field of Classification Search
CPC ............. F04D 15/0066; F04D 15/0254; F04D 15/029; G05D 7/06

USPC ......................................................... 700/282
See application file for complete search history.

(56) References Cited

U.S. PATENT DOCUMENTS

| | | | |
|---|---|---|---|
| 4,805,118 A | 2/1989 | Rishel | |
| 5,742,500 A * | 4/1998 | Irvin | F04D 15/0066 417/2 |
| 8,328,523 B2 | 12/2012 | Kernan et al. | |
| 2011/0081255 A1* | 4/2011 | Steger | F04D 15/0066 417/44.1 |

FOREIGN PATENT DOCUMENTS

| | | |
|---|---|---|
| CN | 101896871 | 11/2010 |
| CN | 102022312 | 4/2011 |

(Continued)

*Primary Examiner* — Emilio J Saavedra
(74) *Attorney, Agent, or Firm* — Ware, Fressola, Maguire & Barber LLP (57) ABSTRACT

Apparatus is provided featuring a signal processor or processing module configured at least to: receive signaling containing information about system energy consumption related to multiple pump combinations running in a multiple pump system; and determine whether to stage or de-stage a pump in the multiple pump system, based at least partly on the signaling received. The signal processor or processing module is configured to provide corresponding signaling containing information about whether to stage or de-stage the pump in the multiple pump system, and to implement control logic or a control logic algorithm based at least partly on the system energy consumption taking the form of specific energy that is a measure of energy used per unit mass for the multiple pump combinations running in the multiple pump system.

33 Claims, 7 Drawing Sheets

Optimized Staging (56) References Cited

FOREIGN PATENT DOCUMENTS

| CN | 102162443 | 8/2011 |
|----|-----------|--------|
| JP | 2010216288 | 9/2010 |
| JP | 2010276006 | 12/2010 |

* cited by examiner

Figure 1

*FIG. 2*: Optimized Staging

Figure 2a

Key for Figure 2 (Optimized Staging)

$QR$ = Pump Flow Ratio, $QR = Q/(Qbep*N/NRtd)$, where $Q$= Qcalc or Qavg
Qcalc = Calculated pump flow, where $Q_{CalcN}$ is the calculated Flow for PumpN
Qavg = $Q_{FM}/n$, where $Q_{avg}$ is the average pump flow and n= number of pumps running
$Q_{FM}$ = Total System Flow if via flowmeter
Qbep = Best efficiency flow at rated speed
$QT = Q1+Q2+Q3+\ldots Qn$, where QT is the total calculated system flow
Q= Qcalc for pump n
SE= Specific Energy
$SE_N = kW_{W-W}/(Q* 60) = kWHr/G$, $SE_N$ is Specific Energy for Pump "N"
$SE_{TOTAL} = SE1 + SE2 + SE3 + SE_N$
$SE_{TOTAL}$ = Total System Specific Energy
$PV_{ACT}$ = Actual process variable
$N_{Max}$ = Maximum speed
$N_{Min}$ = Minimum speed
$N_{RTD}$ = Rated pump speed
$N_{ACT}$ = Actual pump speed
$T_{ACT}\%$ = Actual Pump Torque %
$P_{ACT}$ = Actual pump power
$P_{ACTW-W}$ = Actual pump wire - water power
$PT_{W-W}$ = Total wire to water power
$PT_{W-W} = P_{W-W1} + P_{W-W2} + P_{W-W3} + P_{W-Wn}$
$PMotor_{RTD}$ = Motor Power Rating
SF = Motor service factor Note 1:
 - If QR is > 1.10 Bep then False
 - Calculate and Save SE1 at Setpoint if True
 - If $PV_{ACT}$ <Setpoint at $N_{Min}$ then Lead Unit Sleeps Note 2:
 - If QR is > 1.10 Bep then False
 - Calculate and Save $SE_{Total\ System}$ at Setpoint if True Note 3:
 - Perform SE evaluation one time only
 - If setpoint changes (+5%) and/or speed changes + 10% (System Change); perform SE evaluation again.

Figure 2a (continued)

Rules:
1. If QR > 1.10 or $P_{ACT}$>PMotor$_{RTD}$x SF the next available lag pump should be staged. Note above threshhold values apply to any pump in the system. Value of 1.10 can be modified as desired.

2. In systems where a flow value is unavailable substitute total wire - water power (PTW-W) in place of $SE_{TOTAL}$. For example if $PT_{W-W4}$< $PT_{W-W3}$ then $PT_{W-W4}$ is optimum.

3. If Speed % ($N_{ACT}/N_{RTD}$ if Sync Speed) or Torque % is < the Low limit % a lag pump is automatically de-staged regardless of Specific Energy value.

4. If actual N% > 0.98 x $N_{MAX}$ (sync speed) orT% > 98% (sync torque) and $PV_{ACT}$<setpoint then a pump is automatically staged regardless of Specific Energy. Note value of 0.98 or 98% can be
modified if desired.

FIG. 3: Optimized De-Staging

Figure 3a

Key for Figure 3 (Optimized De-staging)

QR = Pump Flow Ratio, QR = Q/(Qbep*N/NRtd), where Q= Qcalc or Qavg includes
Qcalc = Calculated pump flow, where QCalcN is the calculated Flow for PumpN
Qavg = QFM/n, where Qavg is the average pump flow and n= number of pumps running $Q_{FM}$ = Total System Flow if via flowmeter
Qbep = Best efficiency flow at rated speed
QT = Q1+Q2+Q3+ ...Qn,  where QT is the total calculated system flow
Q= Qcalc for pump n
SE= Specific Energy
$SE_N$ = kWW-W/(Q * 60) = kWHr/G, SEN is Specific Energy for Pump "N"
$SE_{TOTAL}$ = SE1 + SE2 + SE3 + SEN
$SE_{TOTAL}$ = Total System Specific Energy
$PV_{ACT}$ = Actual process variable
$N_{Max}$ = Maximum speed
$N_{Min}$ = Minimum speed
$N_{RTD}$ = Rated pump speed
$N_{ACT}$ = Actual pump speed
Low Limit % = If Speed % (NACT/NRTD if Sync Speed) or Torque % (T% if Sync Torque) is < the Low Limit % a lag pump is automatically de-staged
$T_{ACT}$% = Actual Pump Torque %
$P_{ACT}$ = Actual pump power
$P_{ACTW-W}$ = Actual pump wire - water power
$PT_{W-W}$ = Total wire to water power
$PT_{W-W}$ = PW-W1 +PW-W2 +PW-W3 +PW-Wn
$PMotor_{RTD}$ = Motor Power Rating
SF = Motor service factor Note 1:
 - If QR is > 1.10 Bep then False
 - Calculate and Save SE1 at Setpoint if True
 - If $PV_{ACT}$ <Setpoint at $N_{Min}$ then Lead Unit Sleeps Note 2:
 - If QR is > 1.10 Bep then False
 - Calculate and Save SETotal System at Setpoint if True Note 3:
 - Perform SE evaluation one time only
 - If setpoint changes (-5%) and/or speed changes (-10% System Change); perform SE evaluation again.

Figure 3a (continued)

Rules:
1. If QR > 1.10 or $P_{ACT}$ > $PMotor_{RTD}$ x SF the next available lag pump should be staged. Note above threshhold values apply to any pump in the system. Value of 1.10 can be modified as desired.

2. In systems where a flow value is unavailable substitute total wire - water power ($PT_{W-W}$) in place of $SE_{TOTAL}$. For example if $PT_{W-W4}$ < $PT_{W-W3}$ then $PT_{W-W4}$ is optimum.

3. If Speed % ($N_{ACT}/N_{RTD}$ if Sync Speed) or Torque % is < the Low limit % a lag pump is automatically de-staged regardless of Specific Energy value.

4. If actual N% > 0.98 x $N_{MAX}$ (sync speed) or T% > 98% (sync torque) and $PV_{ACT}$ <setpoint then a pump is automatically staged regardless of Specific Energy. Note value of 0.98 or 98% can be modified if desired.

OPTIMIZED TECHNIQUE FOR STAGING AND DE-STAGING PUMPS IN A MULTIPLE PUMP SYSTEM

CROSS-REFERENCE TO RELATED APPLICATIONS

This application claims benefit to provisional patent application Ser. No. 61/738,129, filed 17 Dec. 2012, which is hereby incorporated by reference in its entirety.

BACKGROUND OF THE INVENTION

1. Field of the Invention

The present invention relates to a technique for controlling pumps in a multiple pump system; and more particularly relates to a technique for determining whether to stage or de-stage one or more pumps in the multiple pump system.

2. Brief Description of Related Art

Known variable frequency drive systems having multiple pumps will turn-on (stage) or turn-off (de-stage) based on the attainment of specific drive values and their relationship to the current process value. Typical drive values used are speed or torque but can also be values of current or power, if pumps are identical. This methodology utilizes the relationship between the actual process variable and the process variable set point and a designated drive value which must be met before determining if a pump should be staged or de-staged. Each pump in the multiple pump system has its own parameter settings for the stage and de-stage threshold values.

U.S. Pat. No. 8,328,523, entitled "Synchronous Torque Balance in Multiple Pump Systems," assigned to the assignee of the instant patent application, discloses a method and apparatus for operating and running multiple pumps together in a system using synchronous torque to achieve a desired set point, which is hereby incorporated by reference in its entirety.

By way of example, shortcomings of the above mentioned devices may include the following:

The setup of variable frequency drive systems having multiple pumps as described in above referenced techniques may be both cumbersome and time consuming. It may also be difficult to determine the appropriate de-stage values without trial and error particularly in systems where load balancing (synchronous torque control) is important or where pumps do not have matched performance. This may result in pumps not turning on or off as required. It can also result in cycling whereby a pump frequently turns off and then back on again due to incorrect threshold values. Additionally, this methodology does not address energy efficiency. If the operating number of pumps is not optimum it will result in higher operating cost.

Further, various types of multiple pump controllers such as variable speed drives (VFD), programmable logic controllers (PLC), distributive control systems (DCS) and SCADA systems proliferate in centrifugal pump processes. In these arrangements, multiple pumps operate in a coordinated fashion to satisfy a set point. Typically, these systems will operate with variable speed drives in a synchronous fashion where all pumps operate at the same speed to achieve a desired set point. The objective of synchronous speed control is to balance the flow of all pumps equally by having all pumps run at the same speed. However, in practice this may not necessarily result in balanced flow. Often multiple pumps are not identical and their head curves may not be closely matched. This can result in uneven flow contribution by each pump which can cause excessive wear and tear on the pump. This problem can be addressed by having the multiple pump system operate in synchronous torque control whereby all pumps operate at the same torque but at slightly different speeds to satisfy the set point. By balancing the torque the total load is shared between the operating pumps and flow balance among pumps is greatly improved.

By way of further example, shortcomings of these further mentioned devices may include the following:

While both of these systems have been successfully employed; both arrangements have similar shortcomings. The setup of these systems is cumbersome and time consuming. Quite often de-stage values are determined through trial and error during commissioning of the system. It is essential to have the correct threshold values to stage or de-stage a pump to prevent premature staging and de-staging or cycling whereby pumps are prematurely turning on and off. Extreme cases could result in a decrease of system reliability and unscheduled maintenance of the equipment. The costs associated with unscheduled maintenance include the repair of equipment, interruptions in production and costs associated with environmental cleanup. Incorrect threshold values also increase operating cost over the life of the system.

The typical multiple pump system has parameters for stage values for each pump. The stage values dictate the required speed that the lead pump must be at before multiple pump operation is allowed by the first lag pump. The multiple pump system will automatically start a lag pump when it is unable to maintain the process set point with the current pumps operating providing the speed or torque value is at or above the stage setting.

As system demand decreases, the need for additional pumps will also decrease. Each pump in the multiple pump system has a parameter for a de-stage value. The de-stage parameters identify when pumps are turned off in normal multiple pump control. The primary consideration is to insure that when a lag pump is shutdown the remaining pumps are capable of meeting the process demand. The de-stage setting defines how much of a speed decrease or torque decrease can occur before a pump can be de-staged.

For all the aforementioned reasons, there is a need in the industry for a better way to stage or de-stage one or more pumps in a multiple pump system.

SUMMARY OF THE INVENTION

It is advantageous to operate a multiple pump system that improves overall system reliability, is easy to setup, and operates at the lowest possible cost. The methodology provided by the present invention does this by utilizing variable speed drives with embedded control logic or algorithms to optimize the staging and de-staging of pumps in a multiple pump system without the use of additional external inputs.

In summary, and by way of example, the present invention overcomes the aforementioned shortcomings of the prior art systems by basing the decision as to whether a pump should be staged or de-staged on an evaluation of specific energy for multiple pump combinations along with certain other criteria which must be met such as the current PV value, pump flow and pump power. Specific energy is a measure of energy used per unit mass. The staging methodology determines the specific energy of the current pumps that are running and the effect on total system specific energy of adding another pump to meet the process demand. The process variable must be met before a pump combination has its specific energy contribution calculated. A comparison can then be made between the two calculated values of system specific energy; the pump combination having the lesser value is chosen for staging. Pump combinations where individual pump flow is greater than a pre-selected value are not considered for selection. In addition, any pump in the combination being evaluated having a power value which exceeds the nameplate motor rating multiplied by a pre-selected service factor will not be considered for selection. If either of these cases occurs an additional pump will automatically be staged prior to calculating the system specific energy. The de-staging methodology works similarly but in reverse with the same basic rules applying. The benefits of this method or technique are that the system setup is simpler, quicker, more reliable and optimized for energy efficiency. The energy optimization is highly accurate and the pumps do not need to have closely matched performance. Although flow is a criterion in specific energy the methodology can still be used if a flow value (actual or calculated) is unavailable.

Specific Embodiments

According to some embodiments, the present invention may include, or take the form of, apparatus featuring a signal processor or processing module configured at least to:
receive signaling containing information about system energy consumption related to multiple pump combinations running in a multiple pump system; and
determine whether to stage or de-stage a pump in the multiple pump system, based at least partly on the signaling received.

The present invention may also include one or more of the following features:

The signal processor or processing module may be configured to provide corresponding signaling containing information about whether to stage or de-stage the pump in the multiple pump system.

The signaling may be received from one or more pumps in a multiple pump system.

The apparatus may include the one or more pumps in a multiple pump system.

The signal processor or processing module may be configured to implement control logic or a control logic algorithm based at least partly on the system energy consumption taking the form of specific energy that is a measure of energy used per unit mass for the multiple pump combinations running in the multiple pump system.

The signal processor or processing module may be configured to determine the specific energy of current pumps running and an effect on a total system specific energy of adding another pump to meet process demands related to the multiple pump system.

The signal processor or processing module may be configured in a first case to make a comparison between two calculated values of system specific energy; and to choose a pump combination either having a lesser value for staging, or having a greater value for de-staging.

The signal processor or processing module may be configured in a second case to evaluate and not consider for selection any pump in a pump combination having a power value which exceeds a nameplate motor rating multiplied by a pre-selected service factor and/or a flow value which exceeds a predetermined BEP Limit Ratio.

The signal processor or processing module may be configured to stage automatically an additional pump if either case occurs prior to calculating the system specific energy.

The signal processor or processing module may be configured as, or forms part of, at least one variable speed drive with embedded control logic to optimize the staging or de-staging of pumps in the multiple pump system, including with the use of additional external inputs.

The signal processor or processing module may be configured with control logic or a control logic algorithm that utilizes calculated flow data that is mathematically determined from various pump and motor parameters, including speed, torque or power or from calibrated flow curves stored in an evaluation device.

The signal processor or processing module may be configured with control logic or a control logic algorithm that uses any drive parameter that has a direct relationship to pump flow.

The signal processor or processing module may be configured to implement control logic or a control logic algorithm based at least partly on the system energy consumption taking the form of relative measures of pumping efficiency, including flow economy which is substantially equal to flow/wire-water power or total system wire-water power, if a flow value is unavailable.

Examples of Optimized Staging

According to some embodiments of the present invention, and by way of example, the signal processor or processing module may be configured with control logic or a control logic algorithm in order to implement optimized staging of one or more pumps in the multiple pump system, consistent with that set forth herein, and as follows:

The signal processor or processing module may be configured to determine if the multiple pump system is operating normally, based at least partly on at least the following three conditions:

$PV_{ACT}$=Set Point, $Q/(Q_{BEP} \times N_{ACT}/N_{RTD})$<BEP Limit Ratio, and $P_{ACT}<P_{RTD} \times SF$, where $PV_{ACT}$ is an Actual Process Variable; $Q=Q_{CALC}$ or $Q_{AVG}$, in which $Q_{CALC}$ is a calculated Flow for pump n, $Q_{AVG}$ is an average pump flow, and $Q_{AVG}$ being $Q_{FM}/n$ for $Q_{FM}$ is the flow meter reading and n is the number of pumps running; $Q_{BEP}$ is a Best Efficiency Flow at a rated pump speed; $N_{ACT}$ is an Actual Pump Speed; $N_{RTD}$ is a Rated Pump Speed; $P_{ACT}$ is an Actual Pump Power; $P_{RTD}$ is a Motor Rating; and SF represents a motor service factor.

The signal processor or processing module may be configured to determine when the multiple pump system is operating in a normal condition, and calculate and save a specific energy value for a lead pump, based at partly on the equation:

$SE=kW_{W-W}/(Q \times 60)=kWHr/G$, and $SE_{TOTAL\ 1}=SE_{PMP1}$, where SE is a calculated Specific Energy for a Pump, $kW_{W-W}$ is an Actual Wire to Water Power, $SE_{TOTAL\ 1}$ is a Calculated System Specific Energy for a one pump system, and $SE_{PMP1}$ is a Calculated Specific Energy for Pump 1.

The signal processor or processing module may be configured to determine to stage a first lag pump, and after a condition normal is reached, calculate a system specific energy SE for the lead pump and the first lag pump, based at least partly as follows:

$$SE_{TOTAL\ 2} = SE_{PMP1} + SE_{PMP2}$$

where $SE_{TOTAL\ 2}$ is a Calculated System Specific Energy for a two pump system, $SE_{PMP1}$ is a Calculated Specific Energy for Pump 1 corresponding to the lead pump and $SE_{PMP2}$ is a Calculated Specific Energy for Pump 2 corresponding to the first lag pump.

The signal processor or processing module may be configured to determine an optimum number of pumps which should run for the operating condition, and make a comparison between $SE_{TOTAL2}$, for the lead pump and the first lag pump running, and $SE_{TOTAL1}$ for the lead pump only running, based at least partly on:

$$SE_{TOTAL2} < SE_{TOTAL1},$$

where if True, then the first lag pump remains staged, and if False, then the first lag pump is de-staged.

The signal processor or processing module may be configured to determine when the multiple pump system is operating in a second condition,
if either:
the BEP Limit Ratio and/or motor power requirement are false, including even if $PV_{ACT}$=Set Point, or
$PV_{ACT}$<set point and the current operating speed, $N_{ACT}$ is >=0.98×$N_{MAX}$,
then the first lag pump is staged.

The signal processor or processing module may be configured to determine when the multiple pump system is operating in the second condition, and also determine not to calculate an SE value when the lead pump only is running.

The signal processor or processing module may be configured to determine when the multiple pump system is operating in the second condition and the first lag pump is staged, calculate and save the $SE_{TOTAL2}$ once condition normal is reached, and determine to stage a second lag pump, and calculate $SE_{TOTAL3}$ once condition normal is reached, based at least partly on the following:

$$SE_{TOTAL3} = SE_{PMP1} + SE_{PMP2} + SE_{PMP3},$$

where $SE_{TOTAL\ 3}$ is a Calculated System Specific Energy for a three pump system, $SE_{PMP1}$ is a Calculated Specific Energy for Pump 1 corresponding to the lead pump, $SE_{PMP2}$ is a Calculated Specific Energy for Pump 2 corresponding to the first lag pump, and $SE_{PMP3}$ is a Calculated Specific Energy for Pump 3 corresponding to the second lag pump.

The signal processor or processing module may be configured to determine an optimum number of pumps which should run for the operating condition, and make a comparison between $SE_{TOTAL3}$, for the lead pump, the first lag pump and the second lag pump running, and $SE_{TOTAL2}$ for the lead pump and the first lag pump running, based at least partly on:

$$SE_{TOTAL3} < SE_{TOTAL2},$$

where
if True, then the first lag pump and the second lag pump remain staged, and
if False, then the second lag pump is de-staged.

Examples of Optimized De-Staging

According to some embodiments of the present invention, and by way of example, the signal processor or processing module may be configured with control logic or a control logic algorithm in order to implement optimized de-staging of one or more pumps in the multiple pump system, consistent with that set forth herein, and as follows:

The signal processor or processing module may be configured to determine when the multiple pump system is operating in a normal condition, and calculate and save a specific energy for n pumps, including a lead pump and one or more lag pumps, based at least partly on the equation:

$$SE = kW_{W-W}/(Q \times 60) = kWHr/G, \text{ and}$$

$$SE_{TOTAL\ n} = SE_{PMP1} + SE_{PMP2} + SE_{PMP3}, \ldots, + SE_{PMPn},$$

where SE is a calculated Specific Energy for a Pump, $kW_{W-W}$ is an Actual Wire to Water Power, $SE_{TOTAL\ n}$ is a Calculated System Specific Energy for n pumps running in a multiple pump system, $SE_{PMP1}$ is a Calculated Specific Energy for Pump 1 corresponding to the lead pump, and $SE_{PMP2}$ to $SE_{PMPn}$ are one or more Calculated Specific Energy for one or more Pumps 2 to n corresponding to the one or more lag pumps.

The signal processor or processing module may be configured in a first operating condition to determine to de-stage a lag pump (last pump which was staged) if the set point is lowered at least 5% or a system change occurs which results in at least a −10% speed change assuming the ($N_{Act}/N_{RTD}$%) and ($T_{ACT}$%) value is above the Low Limit % after a condition normal is reached, calculate a system specific energy SE for n−1 pumps, including the lead pump and any remaining staged lag pumps, based at least partly as follows:

$$SE_{TOTAL\ n-1} = SE_{PMP1} + SE_{PMP2} + SE_{PMP3}, \ldots, + SE_{PMPn-1},$$

where $SE_{TOTAL\ n-1}$ is a Calculated System Specific Energy for n−1 pumps running in a multiple pump system, $SE_{PMP1}$ is a Calculated Specific Energy for Pump 1 corresponding to the lead pump, and $SE_{PMP2}$ to $SE_{PMPn-1}$ are Calculated Specific Energy for Pumps 2 to n−1 corresponding to any remaining staged lag pumps. The above threshold values for the set point change or speed change may be adjusted to suit the application.

The signal processor or processing module may be configured to determine an optimum number of pumps which should run for the operating condition, and make a comparison between $SE_{TOTALn}$, for the pumps 1 to n running, and $SE_{TOTALn-1}$ for the n−1 pumps only running, based at least partly on:

$$SE_{TOTALn} < SE_{TOTALn-1},$$

where if True, then the lag pump which was de-staged is re-staged, and
if False, then the pumps 1 to n−1 remain staged and the lag pump which was de-staged remains de-staged.

The signal processor or processing module may be configured to determine in a second operating condition if the set point is lowered at least 5% or a system change occurs which results in at least a −10% speed change assuming the ($N_{Act}/N_{RTD}$%) and ($T_{ACT}$%) value is below the Low Limit % after a condition normal is reached, and automatically de-stage a first lag pump (last pump which was staged), and once the condition normal is reached, calculate the specific energy for $SE_{TOTALn-1}$, including the lead pump and any remaining staged lag pumps, based at least partly on the following:

$$SE_{TOTALn-1} = SE_{PMP1} + SE_{PMP2} + SE_{PMPn-1},$$

where $SE_{TOTAL\ n-1}$ is a Calculated System Specific Energy for n−1 pumps running in a multiple pump system, $SE_{PMP1}$ is a Calculated Specific Energy for Pump 1 corresponding to the lead pump, and $SE_{PMP2}$ to $SE_{PMPn-1}$ are Calculated Specific Energy for Pumps 2 to n−1 corresponding to any remaining staged lag pumps.

The signal processor or processing module in a second operating condition may be configured to determine to de-stage a second lag pump and after a condition normal is reached, calculate a system specific energy SE for n−2 pumps, including the lead pump and any remaining staged lag pumps, based at least partly as follows:

$$SE_{TOTAL\ n-2} = SE_{PMP1} + SE_{PMP2} + SE_{PMP3}, \ldots, + SE_{PMPn-2},$$

where $SE_{TOTAL\ n-2}$ is a Calculated System Specific Energy for an n−2 pump system, $SE_{PMP1}$ is a Calculated Specific Energy for Pump 1 corresponding to the lead pump, and $SE_{PMP2}$ to $SE_{PMPn-2}$ are Calculated Specific Energy for Pumps 2 to n−2 corresponding to any remaining staged lag pumps.

The signal processor or processing module may be configured to determine in the second operating condition an optimum number of pumps which should run for the operating condition, and make a comparison between $SE_{TOTALn-1}$ for the pumps 1 to n−1 running and $SE_{TOTALn-2}$ for the pumps 1 to n−2 running, based at least partly on the following:

$$SE_{TOTALn-1} < SE_{TOTALn-2}$$

where If True, then the second lag pump is re-staged.

If False, then the second lag pump remains de-staged.

The signal processor or processing module may be configured to determine in a third operating condition if the set point is not being met with all available pumps running, and if so, then de-staging a lag pump is not an option.

The Method

According to some embodiments, the present invention may include, or take the form of, a method featuring steps for receiving in a signal processor or processing module signaling containing information about system energy consumption related to multiple pump combinations running in a multiple pump system; and determining in the signal processor or processing module whether to stage or de-stage a pump in the multiple pump system, based at least partly on the signaling received.

In addition, the method may include a step for providing with the signal processor or processing module corresponding signaling containing information about whether to stage or de-stage the pump in the multiple pump system, as well as steps for implementing one or more of the other features set forth herein.

DETAILED DESCRIPTION OF THE INVENTION

Figure 1:
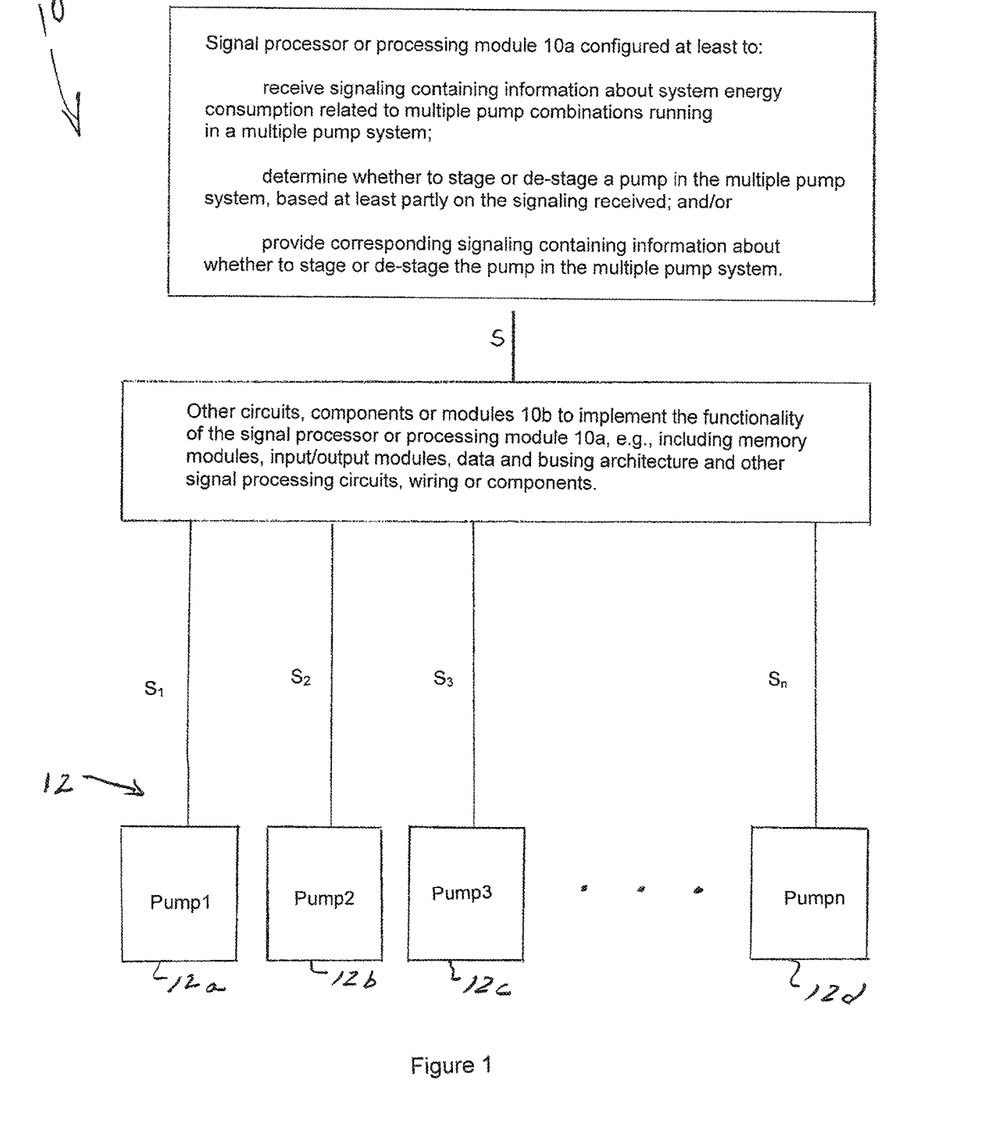
FIG. 1 is a block diagram of apparatus according to some embodiments of the present invention.

FIG. 1: The Basic Apparatus 10

FIG. 1 shows apparatus generally indicated as 10 for implementing some embodiments of the present invention.

By way of example, the apparatus 10 may include, or take the form of, a signal processor or processing module 10a for implementing signal processing functionality associated with the present invention. In operation, the signal processor or processing module 10a may be configured at least to:

receive signaling S containing information about system energy consumption related to multiple pump combinations running in a multiple pump system generally indicated as 12; and determine whether to stage or de-stage a pump in the multiple pump system 12, based at least partly on the signaling S received.

In FIG. 1, the apparatus 10 may include other circuits, components or modules 10b, e.g., arranged between the multiple pump system 12 and the signal processor or processing module 10a. The other circuits, components or modules 10b may be configured to cooperate with the signal processor or processing module 10a in order to implement the signal processing functionality of the signal processor or processing module 10a. The other circuits, components or modules 10b may include, e.g., memory modules, input/output modules, data and busing architecture and other signal processing circuits, wiring or components. By way of example, an output module that forms part of the components or modules 10b may be configured to exchange the signaling S with the signal processor or processing module 10a.

The signal processor or processing module 10a is arranged in relation to n pumps labeled 12a, 12b, 12c and 12d respectively, including pump1, pump2, pump3, . . . and pumpn, in the multiple pump system 12. By way of example, the components or modules 10b and the n pumps 12a, 12b, 12c and 12d may be configured to exchange associated signaling, e.g., having reference labels $S_1, S_2, S_3, \ldots, S_n$ respectively as shown. The signaling S containing information about the system energy consumption related to the multiple pump combinations may form part of the associated signal $S_1, S_2, S_3, \ldots, S_n$ exchanged.

The signal processor or processing module 10a may be configured to provide corresponding signaling containing information about whether to stage or de-stage one or more of the n pumps 12a, 12b, 12c and 12d in the multiple pump system 12. By way of example, the corresponding signaling provided may form part of the exchange of signaling S between the components or modules 10b and the signal processor or processing module 10a, as well as the signal exchange $S_1, S_2, S_3, \ldots, S_n$ between the components or modules 10b and the n pumps 12a, 12b, 12c and 12d. Embodiments are envisioned in which the corresponding signaling is provided via either a hard wiring signal exchange and/or a wireless signal exchange.

According to some embodiments, the apparatus 10 may include, or take the form of, e.g. the signal processor or processing module 10a alone or in combination with the components or modules 10b and/or the one or more n pumps 12a, 12b, 12c and 12d in the multiple pump system 12.

According to some embodiments, and by way of example, the signal processor or processing module 10a may be configured with control logic or a control logic algorithm to implement signal processing functionality, as follows:

The signal processor or processing module 10a may be configured to implement control logic or a control logic algorithm based at least partly on the system energy consumption taking the form of specific energy, e.g., that is a measure of energy used per unit mass for the multiple pump combinations running in the multiple pump system 12.

The signal processor or processing module 10a may be configured to determine the specific energy of current pumps running and the effect on the total system specific energy of adding another pump to meet process demands related to the multiple pump system 12.

The signal processor or processing module 10a may be configured in one case to make a comparison between two calculated values of system specific energy; and to choose a pump combination either having a lesser value for staging, or having a greater value for de-staging.

The signal processor or processing module 10a may be configured in another case to evaluate and determine, e.g. not to consider for selection, any pump in a pump combination having a power value which exceeds a nameplate motor rating multiplied by a pre-selected service factor and/or a flow value which exceeds a predetermined BEP Limit Ratio.

The signal processor or processing module 10a may be configured to stage automatically an additional pump, e.g., if either of the aforementioned cases occurs prior to calculating the system specific energy.

The signal processor or processing module 10a may be configured as, or forms part of, at least one variable speed drive with embedded control logic or a control logic algorithm to optimize the staging or de-staging of pumps in the multiple pump system, e.g., including with the use of additional external inputs, such as from a flow meter.

The signal processor or processing module 10a may be configured with control logic or a control logic algorithm that utilizes calculated flow data that is mathematically determined from various pump and motor parameters, including speed, torque or power or from calibrated flow curves, e.g., stored in an evaluation or memory device that may form part of the components or modules 10b.

The signal processor or processing module 10a may be configured with control logic or a control logic algorithm that uses any drive parameter that has a direct relationship to pump flow, including but not limited to the drive parameter disclosed herein. The scope of the invention is also intended to include other drive parameters that are either now known in the art or later developed in the future.

The signal processor or processing module 10a may be configured to implement control logic or a control logic algorithm based at least partly on the system energy consumption taking the form of one or more relative measures of pumping efficiency, e.g., including flow economy which is substantially equal to flow/wire-water power or total system wire-water power, if a flow value is unavailable.

Pumps like elements 12a, 12b, 12c, 12d are known in the art, and the scope of the invention is not intended to be limited to any particular type or kind thereof.

Figure 2:
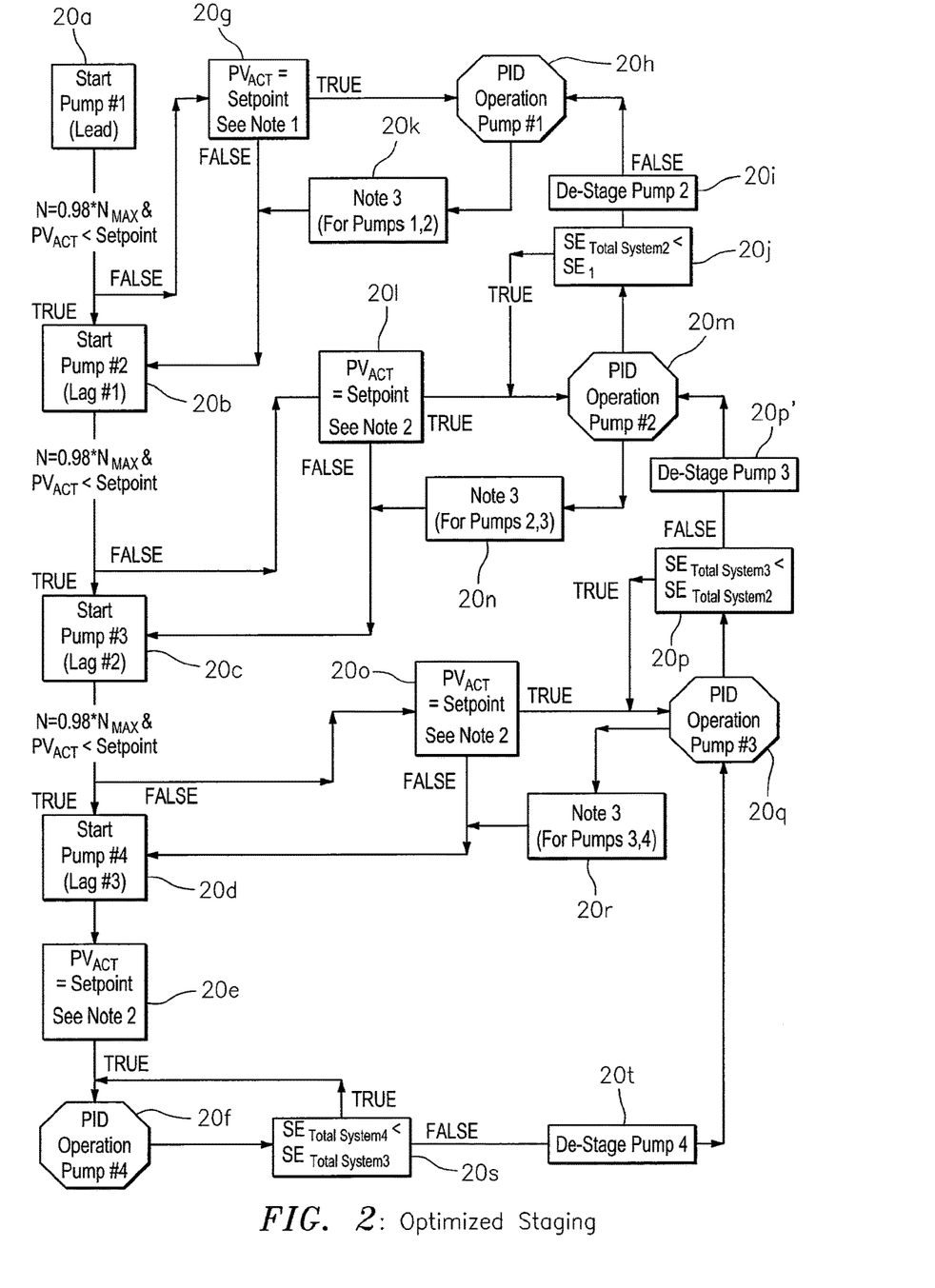
FIG. 2 shows a flow chart for a method having steps for optimized staging in a four pump system, according to some embodiments of the present invention.
Figure 2A:
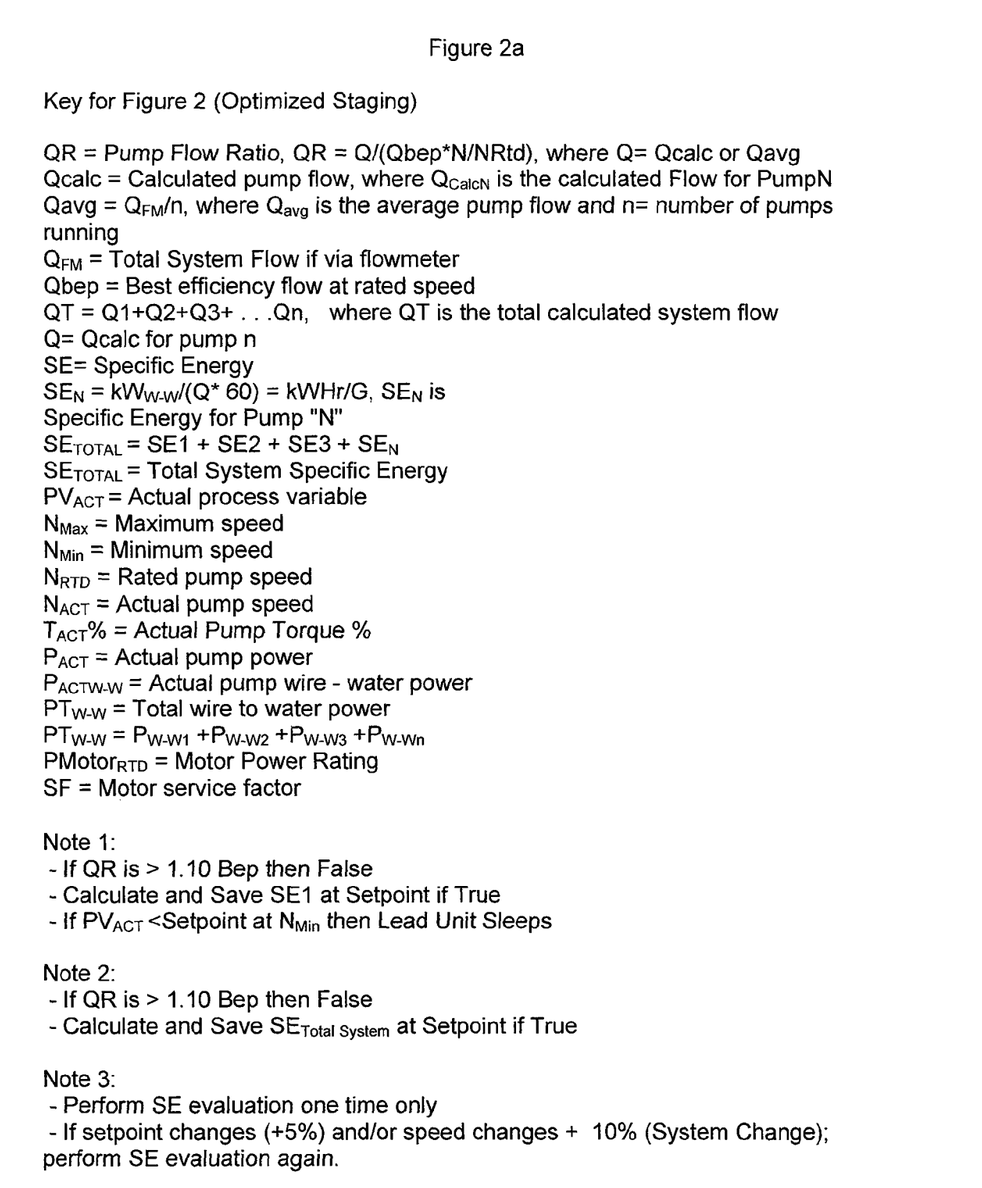
FIG. 2a shows a key having parameters, notes and rules related to various steps in the flowchart shown in FIG. 2.
Figure 3:
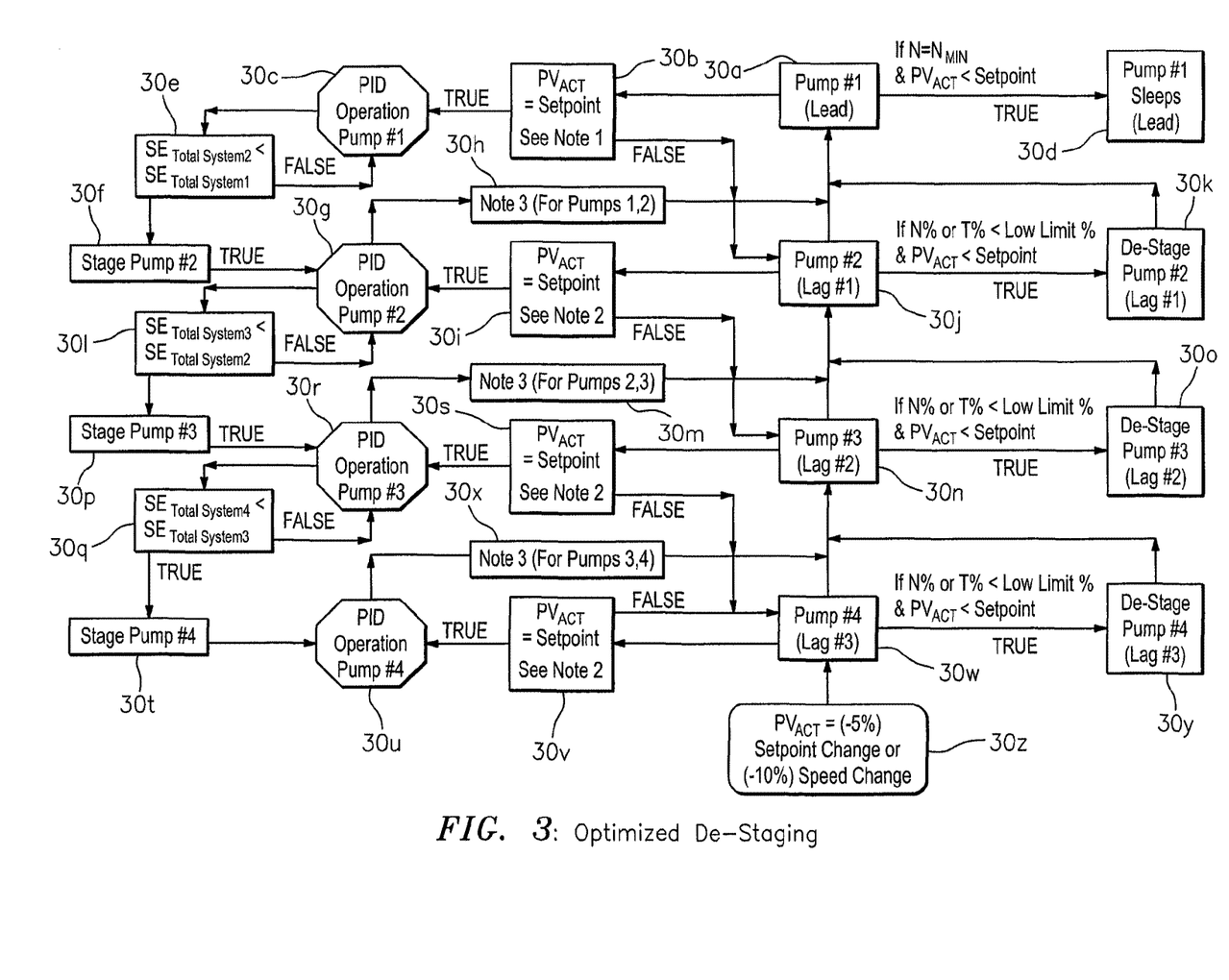
FIG. 3 shows a flow chart for a method having steps for optimized de-staging in a four pump system, according to some embodiments of the present invention.
Figure 3A:
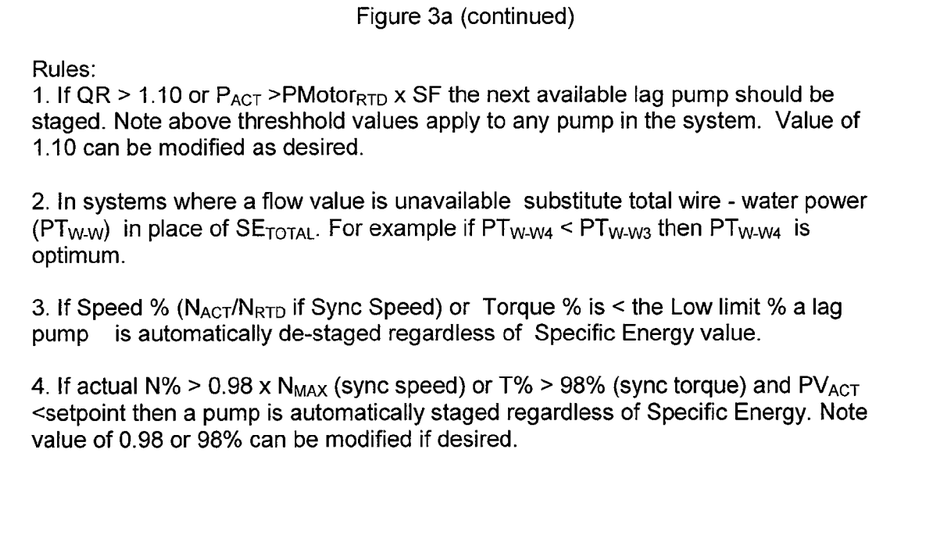
FIG. 3a shows a key having parameters, notes and rules related to various steps in the flowchart shown in FIG. 3.

According to some embodiments, the present invention may also include, or take the form of, a method featuring steps for receiving in the signal processor or processing module 10a signaling containing information about system energy consumption related to multiple pump combinations running in the multiple pump system 12; and determining in the signal processor or processing module 10a whether to stage or de-stage a pump in the multiple pump system 12, based at least partly on the signaling received, consistent with that disclosed herein, including that shown in the flow charts in FIGS. 2 and 3 and described below.

FIGS. 2-3: Examples of Control Logic or Control Logic Algorithms for Implementing Staging or De-Staging of One or More Pumps In particular, and by way of example, FIGS. 2 and 3 show particular examples of flow charts having steps for implementing control logic or control logic algorithms for staging and de-staging of one or more pumps in a multiple pump system like element 12 in FIG. 1.

According to some embodiments of the present invention, the control logic or a control logic algorithm associated with the present invention may be implemented, based at least partly on using parameters, variable frequency drive (VFD) signals and calculated values, as following:

The parameters may include at least the following:
Maximum Pump Speed, $N_{MAX}$
Minimum Pump Speed, $N_{MIN}$
Rated Pump Speed, $N_{RTD}$
Best Efficiency Flow at rated pump speed, $Q_{BEP}$
Motor Rating, $P_{RTD}$
Low Limit %, applies to synchronous speed ($N_{ACT}/N_{RTD}$%) or synchronous torque ($T_{ACT}$%). If the speed or torque % is below the Low Limit % then a lag pump is automatically de-staged. The purpose of this parameter is to limit the low end operating range when multiple pumps are running together to a value greater than minimum speed, $N_{MIN}$. Typically multiple pumps do not operate below 50% rated speed.

The VFD signals may include at least the following:
Actual Pump Speed, $N_{ACT}$
Actual Pump Torque, $T_{ACT}$
Actual Wire to Water Power, $kW_{W-W}$ (includes power losses in VFD, motor and pump)
Actual Process Variable, $PV_{ACT}$
Actual Pump Power, $P_{ACT}$ The calculated values may include at least the following:
Calculated Flow for pump n, $Q_{CALC}$, GPM
Calculated Specific Energy for Pump n, $SE_n$
Calculated System Specific Energy, $SE_{TOTAL}$
Calculated QR, Pump Flow Ratio,
Where $QR=Q/(Q_{BEP} \times N_{ACT}/N_{RTD})$ and $Q=Q_{CALC}$ or $Q_{AVG}$.
If a flow meter is used $Q_{AVG}=Q_{FM}/n$, where $Q_{AVG}$ is the average pump flow, $Q_{FM}$ is the flow meter reading, and n is the number of pumps running.
Calculated System Total Wire to Water Power, $PT_{W-W}$
Note if a flow value is unavailable, then $PT_{W-W}$ can be substituted in the control logic for $SE_{TOTAL}$, where $PT_{W-W}=kW_{W-W1}+kW_{W-W2}+kW_{W-W3}+kW_{W-Wn}$ Further, according to some embodiments of the present invention, the control logic or a control logic algorithm associated with the present invention may be implemented, based at least partly on the following:

1) The control logic or control logic algorithm may utilize calculated flow data which can be mathematically determined from various pump and motor parameters such as speed, torque or power or from calibrated flow curves stored in an evaluation device. In practice however, this logic could be attempted using any drive parameter that has a direct relationship to pump flow. While the logic stresses the functionality without additional external inputs, a direct reading of flow from a flow meter could also be used.

2) Where calculated flow or actual flow may not be available, total system power (wire to water) can be substituted for total system specific energy in the evaluation device. Further, the invention is not intended to be limited to one mathematical definition of system energy consumption, e.g., such as specific energy. The scope of the invention is intended to include, and embodiments are envisioned in which other relative measures of pumping efficiency can also be used in the control logic or control logic algorithm, e.g., such as flow economy which is equal to flow/wirewater power, within the spirit of the underlying invention.

FIG. 2: Optimized Staging

By way of example, FIG. 2 shows a flow chart having steps labeled 20a through 20t for implementing optimized staging, e.g., in a four pump system.

The optimized staging process may begin as follows:

The lead pump may be initially started either manually or by waking-up from a sleep condition after process demand has been re-established.

If the $PV_{ACT}$=Set Point and $Q/(Q_{BEP} \times N_{ACT}/N_{RTD})$<BEP Limit Ratio and $P_{ACT}<P_{RTD} \times SF$, then the system may be determined to be operating normally.

(Note "1.10" is determined to be the default for the BEP Limit Ratio. A calculated value greater than 1.10 is determined to be an indication that the pump may be operating with too much flow. The BEP Limit Ratio can be modified up or down to suit the application.)

The term SF represents a motor service factor (normally 1.0) it also can be modified to suit the application. The equation $P_{ACT}<P_{RTD} \times SF$ is determined to be an indication as to whether the motor may be overloading.

The signal processor or processing module 10a may be configured with a staging control logic or control logic algorithm that evaluates three conditions:
Condition Normal,
Condition 1 and
Condition 2, consistent with that described below.

Condition Normal

If all three of the following conditions are true, then the pump may be determined to be operating normally, including:

$PV_{ACT}$=set point, $Q/(Q_{BEP} \times N_{ACT}/N_{RTD})$<1.10, and the $P_{ACT}<P_{RTD} \times SF$.

Condition 1

When condition normal exists, the specific energy may be calculated and saved for the lead pump by the equation:

$SE=kW_{W-W}/(Q \times 60)=kWHr/G$ $SE_{TOTAL\,1}=SE_{PMP1}$

Lag pump #1 may be then staged, and after condition normal is determined to be reached, the total system SE may be calculated for the lead pump and lag pump #1 as follows:

$SE_{TOTAL2}=SE_{PMP1}+SE_{PMP2}$

To determine the optimum number of pumps which should run for the operating condition, a comparison may be made between $SE_{TOTAL2}$ (lead and lag running) and $SE_{TOTAL1}$ (lead only running):

$SE_{TOTAL2}<SE_{TOTAL1}$

If True, then Lag pump #1 remains staged.
If False, then lag pump #1 de-stages.

Condition 2

If either:
The BEP Limit Ratio and/or motor power requirement are false (even if $PV_{ACT}$=Set Point), or
$PV_{ACT}$<set point and the current operating speed, $N_{ACT}$ is >=$0.98 \times N_{MAX}$,
then the lag pump #1 will also be staged. In other embodiments, the value of 0.98 can be adjusted to suit the application.

(Note in the above scenario if condition 2 exists then an SE value may not be not calculated when the lead pump only is running. If the PV value is determined not to be meeting the set point with only one pump running, or if operating too far out in flow or overloading the motor, then operating one pump only may be determined no longer to be an option.)

In this case, the lag pump #1 may be staged, and the $SE_{TOTAL2}$ may be calculated and saved once condition normal is determined to be reached. Next, lag pump #2 may be staged, and $SE_{TOTAL3}$ may be calculated once condition normal is determined to be reached,
Where:

$SE_{TOTAL3}=SE_{PMP1}+SE_{PMP2}+SE_{PMP3}$.

To determine the optimum number of pumps which should run for the operating condition, a comparison may be made between $SE_{TOTAL3}$ (lead, lag#1 and lag#2 running) and $SE_{TOTAL2}$ (lead and lag #1 running):

$SE_{TOTAL3}<SE_{TOTAL2}$

If True, then Lag pumps #1 and #2 remain staged.
If False, then lag pump #2 de-stages If the set point changes +5% or more and/or the speed changes +10% or more due to a system change, then the SE evaluation may be performed again. In another embodiment these values can be adjusted as required.

The scope of the invention is intended to include the above control logic for staging pumps applying to multiple pump systems having any number of pumps. In other words, the scope of the invention is intended to include implementations in multiple pump systems having more or less than 4 pumps.

FIG. 3: Optimized De-Staging

By way of example, FIG. 3 shows a flow chart having steps labeled 30a through 20z for implementing optimized de-staging, e.g., in a four pump system.

The optimized de-staging process may begins as follows:

By way of example, all four pumps are running and the set point may be lowered at least −5% or a system change occurs resulting in at least a −10% speed change. In another embodiment, these threshold values can be adjusted to suit the application.

Once the reduced set point is determined to be achieved, and $PV_{ACT}$=Set Point and $Q/(Q_{BEP} \times N_{ACT}/N_{RTD})$<BEP Limit Ratio and $P_{ACT}<P_{RTD} \times SF$, the system is determined to be operating normally.

(Note "1.10" is determined to be the default for the BEP Limit Ratio. A calculated value greater than 1.10 is determined to be an indication that the pump is determined to be operating with too much flow. The BEP Limit Ratio can be modified up or down to suit the application.)

The term SF represents a motor service factor (normally 1.0) it also can be modified to suit the application. The equation $P_{ACT} < P_{RTD} \times SF$ is determined to be an indication as to whether the motor may be overloading.

The signal processor or processing module 10a may be configured with a de-staging control logic or control logic algorithm that evaluates four conditions:
Condition Normal,
Condition 1,
Condition 2 and
Condition 3, consistent with that described below.

Condition Normal

If all three of the following conditions are true, then the pump may be determined to be operating normally, including:

$PV_{ACT}$=set point, $Q/(Q_{BEP} \times N_{ACT}/N_{RTD})$<1.10, and the $P_{ACT} < P_{RTD} \times SF$.

Condition 1

Assuming the set point change results in the speed ($N_{ACT}/N_{RTD}$%) or torque ($T_{ACT}$ %) value being above the Low Limit % when condition normal exists, then the specific energy may be calculated and saved for the lead pump and lag pumps #1, #2 and #3 by the equation:

$SE = kW_{W-W}/(Q \times 60) = kWHr/G$ $SE_{TOTAL4} = SE_{PMP1} + SE_{PMP2} + SE_{PMP3} + SE_{PMP4}$ The Lag pump #3 ($SE_{PMP4}$) may be then de-staged, and after condition normal is determined to be reached, the total system SE may be calculated for the lead pump, lag pump #1 and lag pump #2 as follows:

$SE_{TOTAL3} = SE_{PMP1} + SE_{PMP2} + SE_{PMP3}$.

To determine the optimum number of pumps which should run for the operating condition, a comparison may be made between $SE_{TOTAL4}$ (lead, lags #1, #2 and #3 running) and $SE_{TOTAL3}$ (lead, lags #1 and #2 running):

$SE_{TOTAL4} < SE_{TOTAL3}$

If True, then re-stage lag #3.
If False, then lag pump #1 and #2 remain on (lag #3 remains de-staged) and the pump system regulates normally.

Condition 2

If the set point change results in the speed ($N_{ACT}/N_{RTD}$%) or torque ($T_{ACT}$%) value being below the Low Limit %, then Lag pump #3 will automatically de-stage, and once condition normal is determined to be reached, the specific energy may be calculated for $SE_{TOTAL3}$ (Lead, Lag#1 and lag#2).

$SE_{TOTAL3} = SE_{PMP1} + SE_{PMP2} + SE_{PMP3}$

Lag pump #2 may then be de-staged, and after condition normal is determined to be reached, the total system SE may be calculated for the lead pump and lag pump #1 as follows:

$SE_{TOTAL2} = SE_{PMP1} + SE_{PMP2}$.

To determine the optimum number of pumps which should run for the operating condition, a comparison may be made between $SE_{TOTAL3}$ (lead, lags #1 and #2 running) and $SE_{TOTAL2}$ (lead and #1 running):

$SE_{TOTAL3} < SE_{TOTAL2}$

If True, then re-stage lag #2.
If False, then lag pump #1 remains on (lags #2 and #3 remain de-staged) and the pump system regulates normally.

(Note, if after de-staging lag pump #3 if either the BEP Limit Ratio ($Q/(Q_{BEP} \times N_{ACT}/N_{RTD})$<1.10), or motor power requirement ($P_{ACT} < P_{RTD} \times SF$) is determined to be false, then lag pump #3 may be re-staged (even if $PV_{ACT}$=Set Point). This condition may occur if pump performance varies significantly from pump to pump. In this case the Low Limit % should be set to a lower value.)

(Note "1.10" is determined to be the default for the BEP Limit Ratio. A calculated value greater than 1.10 is an indication that the pumps are operating with too much flow. The BEP Limit Ratio can be modified to suit the application. The equation $P_{ACT} < P_{RTD} \times SF$ is determined to be an indication as to whether the motor may be overloading. The term SF represents a motor service factor (normally 1.0) it also can be modified to suit the application.)

Condition 3

In the above example when the lead pump and all lag pumps are running ($SE_{TOTAL4}$) if $PV_{ACT}$<set point and the current operating speed, $N_{ACT}$, is >=0.98×$N_{MAX}$, then no pumps are de-staged.

(Note in the above scenario if condition 3 exists then an SE value is determined not to be calculated. If the set point is determined not to being met with all available pumps running; de-staging a pump is determined not to be an option. In other embodiments, the value of 0.98 can be adjusted as required.)

If the set point changes by at least −5% and/or the speed changes by at least −10% due to a system change the SE evaluation is determined to be performed again. In another embodiment these values can be adjusted as required.

The scope of the invention is intended to include the above control logic for de-staging pumps applying to multiple pump systems having any number of pumps. In other words, the scope of the invention is intended to include implementations in multiple pump systems having more or less than 4 pumps.

One Implementation of Signal Processor 10a

Consistent with that described above, and by way of example, the functionality of the signal processor 10a may be implemented with one or more modules using hardware, software, firmware, or a combination thereof. In a typical software implementation, the one or more modules that form part of the signal processor 10a would include one or more microprocessor-based architectures having a microprocessor, a random access memory (RAM), a read only memory (ROM), input/output devices and control, data and address buses connecting the same. A person skilled in the art would appreciate and be able to program such a microprocessor-based implementation to perform the functionality described herein without undue experimentation. The scope of the invention is not intended to be limited to any particular implementation using some combination of hardware, software, or firmware technology either now known or later developed in the future.

The Signal Processor 10a as a Chipset

In some embodiments according to the present invention, one or more modules of the signal processor 10a may also form part of a basic chipset implementation. The present invention may also take the form of the chipset that may include a number of integrated circuits designed to perform one or more related functions, including a chipset or chip formed as a group of integrated circuits, or chips, that are designed to work together. For example, one chipset may provide the basic functions of the overall controller, while another chipset may provide control processing unit (CPU) functions for a computer or processor in overall controller. Newer chipsets generally include functions provided by two or more older chipsets. In some cases, older chipsets that required two or more physical chips can be replaced with a chipset on one chip. The term "chipset" is also intended to include the core functionality of a motherboard in such a controller.

Possible Applications

Possible applications may include: Systems having multiple pumps which work together to achieve a process set point. These systems can operate in either synchronous speed or synchronous torque. Additionally, this logic can also be applied in similar systems using fans. The logic employed in these systems can be embedded in various types of controllers such as variable speed drives (VFD), programmable logic controllers (PLC), distributive control systems (DCS) and SCADA systems The Scope of the Invention It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What I claim is:

1. Apparatus comprising:
a signal processor or processing module configured at least to:
receive signaling containing information about system energy consumption related to multiple pump combinations running in a multiple pump system, and also about corresponding system energy consumption related to corresponding multiple pump combinations for staging or destaging a pump in the multiple pump system; and
determine corresponding signaling containing information about whether to stage or de-stage the pump in the multiple pump system, based in part upon a comparison of the system energy consumption and the corresponding system energy consumption and the signaling received;
wherein the signal processor or processing module is configured to implement control logic or a control logic algorithm and determine if the multiple pump system is operating normally, based upon at least the following three conditions:

$PV_{ACT}$=Set Point, $Q/(Q_{BEP} \times N_{ACT}/N_{RTD})$<BEP Limit Ratio, and $P_{ACT} < P_{RTD} \times SF$, where $PV_{ACT}$ is an Actual Process Variable received from one or more sensors located on the pump; Set Point is a setting related to flow and pressure for the multiple pump system; $Q=Q_{CALC}$ or $Q_{AVG}$, in which $Q_{CALC}$ is a calculated Flow for pump n, $Q_{AVG}$ is an average pump flow, and $Q_{AVG}$ being $Q_{FM}/n$ for $Q_{FM}$ is the flow meter reading and n is the number of pumps running; $Q_{BEP}$ is a Best Efficiency Flow at a rated pump speed; $N_{ACT}$ is an Actual Pump Speed; $N_{RTD}$ is a Rated Pump Speed; $P_{ACT}$ is an Actual Pump Power; $P_{RTD}$ is a Motor Rating; and SF represents a motor service factor.

2. Apparatus according to claim 1, wherein the signal processor or processing module is configured to provide the corresponding signaling as control signaling to stage or de-stage the pump in the multiple pump system.

3. Apparatus according to claim 1, wherein the signal processor or processing module is configured to implement control logic or a control logic algorithm based upon the system energy consumption taking the form of specific energy that is a measure of energy used per unit mass for the multiple pump combinations running in the multiple pump system.

4. Apparatus according to claim 3, wherein the signal processor or processing module is configured to determine the specific energy of current pumps running and an effect on a total system specific energy of adding another pump to meet process demands related to the multiple pump system.

5. Apparatus according to claim 4, wherein the signal processor or processing module is configured in a first case to make the comparison between two calculated values of system specific energy; and to choose a pump combination either having a lesser value for staging, or having a greater value for de-staging.

6. Apparatus according to claim 5, wherein the signal processor or processing module is configured in a second case to evaluate and not consider for selection any pump in a pump combination having a power value which exceeds a nameplate motor rating multiplied by a pre-selected service factor.

7. Apparatus according to claim 6, wherein the signal processor or processing module is configured to stage automatically an additional pump if either cases occurs prior to calculating the system specific energy.

8. Apparatus according to claim 1, wherein the signal processor or processing module is configured as, or forms part of, at least one variable speed drive with embedded control logic to optimize the staging or de-staging of pumps in the multiple pump system, including with the use of additional external inputs.

9. Apparatus according to claim 1, wherein the signal processor or processing module is configured with control logic or a control logic algorithm that utilizes calculated flow data that is mathematically determined from various pump and motor parameters, including speed, torque or power or from calibrated flow curves stored in an evaluation device.

10. Apparatus according to claim 1, wherein the signal processor or processing module is configured with control logic or a control logic algorithm that uses any drive parameter that has a direct relationship to pump flow.

11. Apparatus according to claim 1, wherein the signal processor or processing module is configured to implement control logic or a control logic algorithm based upon the system energy consumption taking the form of relative measures of pumping efficiency, including flow economy which is substantially equal to flow/wire-water power.

12. Apparatus according to claim 1, the signal processor or processing module is configured to determine when the multiple pump system is operating in a normal condition, and calculate and save a specific energy for a lead pump, based upon the equation:

$$SE=kW_{W\text{-}W}/(Q\times 60)=kWHr/G, \text{ and}$$

$$SE_{TOTAL\ 1}=SE_{PMP1},$$

where SE is a calculated Specific Energy for a Pump, $kW_{W\text{-}W}$ is an Actual Wire to Water Power, $SE_{TOTAL\ 1}$ is a Calculated System Specific Energy for a one pump system, and $SE_{PMP1}$ is a Calculated Specific Energy for Pump 1.

13. Apparatus according to claim 12, wherein the signal processor or processing module is configured to determine to stage a first lag pump, and after a condition normal is reached, calculate a system specific energy SE for the lead pump and the first lag pump, based upon the equation as follows:

$$SE_{TOTAL\ 2}=SE_{PMP1}+SE_{PMP2},$$

where $SE_{TOTAL\ 2}$ is a Calculated System Specific Energy for a two pump system, $SE_{PMP1}$ is a Calculated Specific Energy for Pump 1 corresponding to the lead pump and $SE_{PMP2}$ is a Calculated Specific Energy for Pump 2 corresponding to the first lag pump.

14. Apparatus according to claim 13, wherein the signal processor or processing module is configured to determine an optimum number of pumps which should run for the operating condition, and make a comparison between $SE_{TOTAL2}$, for the lead pump and the first lag pump running, and $SE_{TOTAL1}$ for the lead pump only running, based upon the equation:

$$SE_{TOTAL2}<SE_{TOTAL1},$$

where if True, then the first lag pump remains staged, and if False, then the first lag pump is de-staged.

15. Apparatus according to claim 1, wherein the signal processor or processing module is configured to determine when the multiple pump system is operating in a second condition,
if either:
the BEP Limit Ratio and/or motor power requirement are false, including even if $PV_{ACT}$=Set Point, or $PV_{ACT}$<set point and the current operating speed, and $N_{ACT}$ is >=0.98×$N_{MAX}$,
then the first lag pump is staged.

16. Apparatus according to claim 15, wherein the signal processor or processing module is configured to determine when the multiple pump system is operating in the second condition, and also determine not to calculate an SE value when the lead pump only is running.

17. Apparatus according to claim 15, wherein the signal processor or processing module is configured to determine when the multiple pump system is operating in the second condition and the first lag pump is staged, calculate and save the $SE_{TOTAL2}$ once condition normal is reached, and determine to stage a second lag pump, and calculate $SE_{TOTAL3}$ once condition normal is reached, based upon the following:

$$SE_{TOTAL3}=SE_{PMP1}+SE_{PMP2}+SE_{PMP3},$$

where $SE_{TOTAL\ 3}$ is a Calculated System Specific Energy for a three pump system, $SE_{PMP1}$ is a Calculated Specific Energy for Pump 1 corresponding to the lead pump, $SE_{PMP2}$ is a Calculated Specific Energy for Pump 2 corresponding to the first lag pump, and $SE_{PMP3}$ is a Calculated Specific Energy for Pump 3 corresponding to the second lag pump.

18. Apparatus according to claim 17, wherein the signal processor or processing module is configured to determine an optimum number of pumps which should run for the operating condition, and make a comparison between $SE_{TOTAL3}$, for the lead pump, the first lag pump and the second lag pump running, and $SE_{TOTAL2}$ for the lead pump and the first lag pump running, based upon the equation:

$$SE_{TOTAL3}<SE_{TOTAL2},$$

where
if True, then the first lag pump and the second lag pump remain staged, and
if False, then the second lag pump is de-staged.

19. Apparatus according to claim 1, wherein the signal processor or processing module is configured to determine when the multiple pump system is operating in a normal condition, and calculate and save a specific energy for n pumps, including a lead pump and one or more lag pumps, based upon the equation:

$$SE=kW_{W\text{-}W}/(Q\times 60)=kWHr/G, \text{ and}$$

$$SE_{TOTAL\ n}=SE_{PMP1}+SE_{PMP2}+SE_{PMP3},\ldots,SE_{PMPn},$$

where SE is a calculated Specific Energy for a Pump, $kW_{W\text{-}W}$ is an Actual Wire to Water Power, $SE_{TOTAL\ n}$ is a Calculated System Specific Energy for an n pump system, $SE_{PMP1}$ is a Calculated Specific Energy for Pump 1 corresponding to the lead pump, and $SE_{PMP2}$ to $SE_{PMPn}$ are one or more Calculated Specific Energy for one or more Pumps 2 to n corresponding to the one or more lag pumps.

20. Apparatus according to claim 19, wherein the signal processor or processing module in a first operating condition is configured to determine to de-stage a first lag pump) if the set point change results in a speed ($N_{ACT}/N_{RTD}$ %) or torque ($T_{ACT}$ %) value being above a Low Limit % and after a condition normal is reached, calculate a system specific energy SE for n−1 pumps, including the lead pump and any remaining staged lag pumps, based upon the equation as follows:

$$SE_{TOTAL\ n-1}=SE_{PMP1}+SE_{PMP2}+SE_{PMP3},\ldots,+SE_{PMPn-1},$$

where $SE_{TOTAL\ n-1}$ is a Calculated System Specific Energy for an n−1 pump system, $SE_{PMP1}$ is a Calculated Specific Energy for Pump 1 corresponding to the lead pump, and $SE_{PMP2}$ to $SE_{PMPn-1}$ are Calculated Specific Energy for Pumps 2 to n−1 corresponding to any remaining staged lag pumps.

21. Apparatus according to claim 20, wherein the signal processor or processing module is configured to determine an optimum number of pumps which should run for the operating condition, and make a comparison between $SE_{TOTALn}$, for the pumps 1 to n running, and $SE_{TOTALn-1}$ for the n−1 pumps only running, based upon the equation:

$$SE_{TOTALn}<SE_{TOTALn-1},$$

where if True, then the first lag pump is re-staged, and
if False, then the pumps 1 to n−1 remain staged and the first lag pump remains de-staged.

22. Apparatus according to claim 19, wherein the signal processor or processing module is configured to determine in a second operating condition that the set point change results in a speed ($N_{ACT}/N_{RTD}$ %) or torque ($T_{ACT}$ %) value being below a Low Limit % when a condition normal exists, and automatically de-stage a first lag pump, and once the condition normal is reached, calculate the specific energy for $SE_{TOTALn-1}$, including the lead pump and any remaining staged lag pumps, based upon the following:

$$SE_{TOTAL n-1} = SE_{PMP1} + SE_{PMP2} + \ldots + SE_{PMPn-1},$$

where $SE_{TOTAL\ n-1}$ is a Calculated System Specific Energy for n−1 pumps running in a multiple pump system, $SE_{PMP1}$ is a Calculated Specific Energy for Pump 1 corresponding to the lead pump, and $SE_{PMP2}$ to $SE_{PMPn-1}$ are Calculated Specific Energy for Pumps 2 to n−1 corresponding to any remaining staged lag pumps.

23. Apparatus according to claim 22, wherein the signal processor or processing module in a second operating condition is configured to determine to de-stage a second lag pump and after a condition normal is reached, calculate a system specific energy SE for n−2 pumps, including the lead pump and any remaining staged lag pumps, based upon the equation as follows:

$$SE_{TOTAL\ n-2} = SE_{PMP1} + SE_{PMP2} + SE_{PMP3}, \ldots, + SE_{PMPn-2},$$

where $SE_{TOTAL\ n-2}$ is a Calculated System Specific Energy for an n−2 pump system, $SE_{PMP1}$ is a Calculated Specific Energy for Pump 1 corresponding to the lead pump, and $SE_{PMP2}$ to $SE_{PMPn-2}$ are Calculated Specific Energy for Pumps 2 to n−2 corresponding to any remaining staged lag pumps.

24. Apparatus according to claim 23, wherein the signal processor or processing module is configured to determine in the second operating condition an optimum number of pumps which should run for the operating condition, and make a comparison between $SE_{TOTALn-1}$ for the pumps 1 to n−1 running and $SE_{TOTALn-2}$, for the pumps 1 to n−2 running based upon the equation:

$$SE_{TOTALn-1} < SE_{TOTALn-2},$$

where If True, then the second lag pump is re-staged, and If False, then the second lag pump remains de-staged.

25. Apparatus according to claim 19, wherein the signal processor or processing module is configured to determine in a third operating condition if the set point is not being met with all available pumps running, and if so, then de-staging a lag pump is not an option.

26. Apparatus according to claim 1, wherein the apparatus comprises, or takes the form of, the multiple pump system having multiple pumps for arranging or configuring in the multiple pump combinations.

27. A method comprising:
receiving in a signal processor or processing module signaling containing information about system energy consumption related to multiple pump combinations running in a multiple pump system, and also about corresponding system energy consumption related to corresponding multiple pump combinations for staging or destaging a pump in the multiple pump system;
determining in the signal processor or processing module corresponding signaling containing information about whether to stage or de-stage the pump in the multiple pump system, based upon a comparison of the system energy consumption and the corresponding system energy consumption and the signaling received; and
implementing in the signal processor or processing module to implement control logic or a control logic algorithm and determining if the multiple pump system is operating normally, based upon at least the following three conditions:

$PV_{ACT}$=Set Point, $Q/(Q_{BEP} \times N_{ACT}/N_{RTD})$<BEP Limit Ratio, and $P_{ACT} < P_{RTD} \times SF,$ where $PV_{ACT}$ is an Actual Process Variable received from one or more sensors located on the pump: Set Point is a setting related to flow and pressure for the multiple pump system; $Q = Q_{CALC}$ or $Q_{AVG}$, in which $Q_{CALC}$ is a calculated Flow for pump n, $Q_{AVG}$ is an average Dump flow, and $Q_{AVG}$ being $Q_{FM}/n$ for $Q_{FM}$ is the flow meter reading and n is the number of pumps running; $Q_{BEP}$ is a Best Efficiency Flow at a rated pump speed; $N_{ACT}$ is an Actual Pump Speed; $N_{RTD}$ is a Rated Pump Speed: $P_{ACT}$ is an Actual Pump Power; $P_{RTD}$ is a Motor Rating; and SF represents a motor service factor.

28. A method according to claim 27, wherein the method comprises providing with the signal processor or processing module the corresponding signaling as control signaling to stage or de-stage the pump in the multiple pump system.

29. A method according to claim 27, wherein the method comprises implementing with the signal processor or processing module control logic or a control logic algorithm based at least partly on the system energy consumption taking the form of specific energy that is a measure of energy used per unit mass for the multiple pump combinations running in the multiple pump system.

30. A method according to claim 29, wherein the method comprises determining with the signal processor or processing module the specific energy of current pumps running and an effect on a total system specific energy of adding another pump to meet process demands related to the multiple pump system.

31. Apparatus comprising:
means for receiving in a signal processor or processing module signaling containing information about system energy consumption related to multiple pump combinations running in a multiple pump system, and also about corresponding system energy consumption related to corresponding multiple pump combinations for staging or destaging a pump in the multiple pump system;
means for determining in the signal processor or processing module corresponding signaling containing information about whether to stage or de-stage a pump in the multiple pump system, based upon a comparison of the system energy consumption and the corresponding system energy consumption and the signaling received; and
means for implementing in the signal processor or processing module to implement control logic or a control logic algorithm and determining if the multiple pump system is operating normally, based upon at least the following three conditions:

$PV_{ACT}$=Set Point, $Q/(Q_{BEP} \times N_{ACT}/N_{RTD})$<BEP Limit Ratio, and $P_{ACT} < P_{RTD} \times SF,$ where $PV_{ACT}$ is an Actual Process Variable received from one or more sensors located on the pump; Set Point is a setting related to flow and pressure for the multiple pump system; $Q = Q_{CALC}$ or $Q_{AVG}$, in which $Q_{CALC}$ is a calculated Flow for pump n, $Q_{AVG}$ is an average pump flow, and $Q_{AVG}$ being $Q_{FM}/n$ for $Q_{FM}$ is the flow meter reading and n is the number of pumps running; $Q_{BEP}$ is a Best Efficiency Flow at a rated pump speed; $N_{ACT}$ is an Actual Pump Speed; $N_{RTD}$ is a Rated Pump Speed; $P_{ACT}$ is an Actual Pump Power; $P_{RTD}$ is a Motor Rating; and SF represents a motor service factor.

32. Apparatus according to claim 31, wherein the apparatus comprises means for providing with the signal processor or processing module the corresponding signaling as control signaling to stage or de-stage the pump in the multiple pump system.

33. Apparatus according to claim 31, wherein the apparatus comprises, or takes the form of, the multiple pump system having multiple pumps for arranging or configuring in the multiple pump combinations.

* * * * *